Patented Feb. 12, 1946

2,394,862

UNITED STATES PATENT OFFICE 2,394,862

MODIFIED POLYMERS OF DIOXOLANE

Donald John Loder and William Franklin Gresham, Wilmington, Del., assignors to E. I. du Pont de Nemours & Company, Wilmington, Del., a corporation of Delaware No Drawing. Application May 29, 1942, Serial No. 445,012

9 Claims. (Cl. 260—86)

This invention relates to a process for the preparation of organic polymeric compounds and more particularly to their preparation from 1,3-dioxolane and unsaturated compounds. It likewise relates to the resulting polymers.

The present invention provides new reaction products obtainable from 1,3-dioxolane and other organic compounds. Another object of the invention is to provide new compositions of matter from 1,3-dioxolane or its substitution products and compounds containing a carbon-carbon unsaturated linkage. Yet another object is to provide a process for the interaction of 1,3-dioxolane and its substitution products with unsaturated compounds generally in the presence of an acidic type catalyst. Another object is to provide reaction conditions and catalysts for such reactions whereby valuable products are obtainable. Other objects and advantages of the invention will hereinafter appear.

Valuable products are obtained in accord with the invention by reacting 1,3-dioxolane, substituted 1,3-dioxolane, (or reactants which form these compounds) with compounds containing unsaturated carbon-carbon linkages such, for example, as the unsaturated hydrocarbons conforming with the formulas: $C_nH_{2n}$; $C_nH_{2n-2}$ as well as similar symmetrical and unsymmetrical hydrocarbons and oxygenated hydrocarbons generally containing a double or triple unsaturated bond between carbon atoms.

The products of the invention range from compounds of low molecular weight to those having relatively high molecular weight. The latter will hereinafter be referred to as polymers, which term will include all products containing in the molecule at least one 1,3-dioxolane (or substituted 1,3-dioxolane) residue and at least two residues of the unsaturated compound reacted or vice versa. For example, the polymers resulting from the reaction of 1,3-dioxolane with ethylene will contain at least one 1,3-dioxolane residue —$CH_2OCH_2CH_2O$— and at least one ethylene residue, —$CH_2CH_2$—, there being a minimum of at least three residues two of which are the same. Most of the polymers of the invention are believed to have a linear form although cyclic polymers may be present. It is not intended that the above theoretical description of the polymers will limit the invention for it is possible that the polymers may exist in other forms.

The unsaturated compounds may be reacted, in accord with the procedural details more fully particularized hereinafter, with 1,3-dioxolane and its substitution products. 1,3-dioxolane has the chemical formula with numbering as shown:

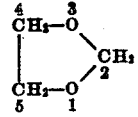

and may be obtained by reacting formaldehyde or a formal with ethylene glycol. Products with substituents in the 2 position can be readily obtained by reaction of ketones or other aldehydes either aliphatic or aromatic with ethylene glycol. Thus, many compounds are obtained which may be employed in accord with the invention such as, for example, 2-methyl-1,3-dioxolane,
2-ethyl-1,3-dioxolane,
2,2-dimethyl-1,3-dioxolane,
2,2-diethyl-1,3-dioxolane,
2-phenyl-1,3-dioxolane,
2,2-methylphenyl-1,3-dioxolane, and higher dioxolanes substituted in like manner which may, for example, be obtained from ethylene glycol and acetaldehyde, propanal, acetone, diethyl ketone, benzaldehyde, methyl phenyl ketone, and higher substituted aldehydes respectively. The invention likewise contemplates the use of dioxolanes substituted in the 4 and/or 5 positions. These dioxolanes are obtained by the interaction of substituted 1,2-glycols with aldehydes, for example, 1,2-propylene glycol plus formaldehyde will give 4-methyl-1,3-dioxolane and similarly the following dioxolanes can be readily prepared from formaldehyde and the corresponding glycols:

4-ethyl-1,3-dioxolane,
4-propyl-1,3-dioxolane,
4,5-dimethyl-1,3-dioxolane.

The acetals obtained by the reaction of vicinal glycols with aldehydes or acetals and especially formaldehyde or methylal may also be used. Reactants may be used which form 1,3-dioxolane during the reaction, there being present under these conditions the unsaturated compound to be reacted together with, for example, formaldehyde 'and ethylene glycol, a formal and ethylene glycol, or other reactants which will form 1,3-dioxolane. Similarly the reactants which form the other dioxolanes may be used in lieu of the dioxolane.

The above dioxolanes or reactants which will form dioxolanes may be reacted with unsaturated compounds generally and more particularly, by way of example, the unsaturated hydrocarbons of the class $C_nH_{2n}$ which include such olefines as:

Ethylene,
Propylene,
Butylene,
Amylene,
Hexylene,
Cetene,
Cyclohexene, and the higher olefines; the unsaturated hydrocarbons of the acetylene series which include, by way of example, Acetylene,
Allylene,
Crotonylene,
Valarylene, and the higher unsaturated compounds of this group. Other unsaturated compounds are likewise, included, such, for example, as, Esters, amides, nitriles, and other derivatives of acrylic acid,
Esters, amides, nitriles, and other derivatives of alpha-substituted acrylic acid,
Vinyl chloride,
Vinyl acetate,
Vinyl chloracetate,
Polyvinyl alcohols containing unsaturation,
Styrene,
Isoprene,
Butadiene,
Natural and synthetic rubber,
Chloroprene,
Monovinyl acetylene, and
Divinyl acetylene.

Valuable polymers are obtainable from the reaction of small amounts of 1,3-dioxolane or its derivatives with large amounts of the unsaturated compound, that is, in the order of 1–100 and the reverse is also true. The greater the amount of 1,3-dioxolane present, the greater becomes the viscosity of the polymers until solids are eventually produced, while contrarywise, the greater the ratio of the unsaturated compound the less viscous will be the resulting polymer.

The reaction between the 1,3-dioxolane and unsaturated compound is effected at temperatures ranging between —80 and 300° C. and preferably between 0 and 150° C. Atmospheric, sub- or super-atmospheric pressures may be used and, if the last, pressure may range between 1 and 1000 atmospheres or higher. Normally excellent results are obtained at or about atmospheric pressure. If desired, the temperature of the reaction, especially when polymerization is carried out at or above the boiling point of the reaction mixture, may be controlled by varying the pressure on the boiling reactants.

It has been found advantageous to effect the reaction in the presence of an acidic type catalyst, such, for example, as sulfuric acid and phosphoric acid; the halogen acids, such as hydrochloric acid, hydrofluoric acid (alone or with $BF_3$); boron fluoride (including its complexes with water, acids, esters, alcohols, and the like), paratoluene sulfonic acid, camphor sulfonic acid, and other acid catalysts of this general nature. Friedel-Crafts type catalysts other than $BF_3$ may be used, such as $AlCl_3$, $AlBr_3$, $FeCl_3$, and so forth, as well as inorganic acids generally and their acid salts such as sodium acid sulfate, sodium acid phosphate, and so forth.

The catalyst may be supported or not on inert supports such as charcoal, silica gel (which alone is a catalyst for the reaction), kieselguhr, and so forth. Concentrations of $BF_3$, $H_2SO_4$ and similarly strong catalysts may be extremely low; less than 0.1%, and amounts down to as low as 0.001% of the strong acid catalyst have been found sufficient to give polymers although high concentrations of the catalyst even equal to or greater than the weight of the dioxolane are likewise satisfactory.

The reaction is preferably continued approximately to equilibrium in order to obtain the above defined polymeric organic compounds. The reaction may then be stopped by destroying the catalyst. This may be done by removing it (in the case of silica gel, kieselguhr, and the like) or by treating the reaction mixture with an inorganic base, such as ammonia, alkali metal, and alkaline earth metal hydroxides, carbonates, alkoxides, and so forth or an organic base, such as pyridine, dimethylamine, and the like. These bases are added in sufficient amounts to neutralize the catalyst when acid catalysts are used, and the unconverted reactants may be removed by distillation under reduced pressure. As soon as the catalyst has been neutralized, the reaction ceases. The neutralized catalyst may be filtered off and the polymerized product which remains treated for the recovery of the polymers.

In the reaction of the dioxolanes with the unsaturated compounds and more especially when the higher molecular weight products are being prepared there usually will be found in the reaction mixture along with the polymer unreacted dioxolane and the unsaturated compound together with by-products and polymers which it is not desired to produce. It is possible to inhibit the formation of the undesired products by carrying out the process in an intermittent or continuous manner whereby the desired polymer is withdrawn from the reaction zone and the undesirable products, after being separated therefrom, are returned to the reaction zone. By this means it is possible to obtain high yields of the desired polymer.

In addition to being instrumental in stopping the reaction at the desired point, the neutralization of the catalyst tends to stabilize the polymers. It follows, therefore, that for high temperature uses no acid should be present in the polymers and preferably they should be neutral or on the alkaline side.

Examples will now be given illustrating embodiments of the invention but it will be understood that it will not be limited by the details thereof. Parts are by weight unless otherwise indicated.

*Example 1.*—A reaction mixture was prepared by mixing 0.1 mole of cetene, $C_{16}H_{32}$, and 3 moles of 1,3-dioxolane with 0.37 mole of $BF_3$. The resulting mixture was heated on a steam bath for 4½ hours and the reaction product subsequently neutralized with ammonia followed by the addition of 0.12 moles of sodium hydroxide and one mole of water. 193 parts of a reddish brown solid was obtained as the product which was soluble in water and developed foam in aqueous solutions. This product had a molecular weight between 1140 and 1150, a hydroxyl number of 73, and an iodine number of 7.

*Example 2.*—A mixture was prepared containing 0.675 mole of styrene, 0.675 mole of 1,3-dioxolane and approximately 0.07 mole of boron fluoride. The resulting mixture was allowed to stand at room temperature for 28 days. The catalyst was then neutralized with ammonia in benzene and the product was found to contain a benzene soluble fraction containing 69.2% styrene and 38.1% of a 1,3-dioxolane interpolymer (by carbon and hydrogen analysis). A fraction difficultly soluble in benzene was also obtained containing 87.1% styrene and 12.9% 1,3-dioxolane. This product was a white, solid, somewhat brittle fibrous material.

*Example 3.*—A mixture was prepared containing one mole of styrene, one mole of 1,3-dioxolane, and 0.14 mole of boron trifluoride. The mixture was heated on a steam bath for 17 hours and the catalyst subsequently neutralized with sodium hydroxide to blue litmus. The reaction mixture was distilled at 100° C. and 2 mm. for the removal of 40.2 parts and there remained in solution in benzene a product which upon subsequent precipitation in methanol gave a white, tacky, fibrous interpolymer containing 90.7% styrene and 9.3% dioxolane.

*Example 4.*—A mixture was prepared containing 0.25 mole of styrene, 2 moles of 1,3-dioxolane and 0.14 mole of boron fluoride. After 7 days at room temperature the catalyst was neutralized by solution of the reaction mixture in benzene containing ammonia and the product subsequently precipitated by pouring the neutralized mixture into methanol. The precipitated and dried product had a molecular weight of approximately 19,355, an iodine number of 1.0 and on carbon and hydrogen analysis gave 82% combined dioxolane and 17.9% of styrene.

*Example 5.*—A mixture containing one mole of butadiene, 1.35 moles of 1,3-dioxolane, and 0.14 mole of $BF_3$ was heated to a temperature of 70° C. for 5½ hours. After neutralization with ammonia and distilling off the distillable products at a temperature of 150° C. at 1 mm., 16 grams of the polymer were obtained having an iodine number of 27.26, a molecular weight of 646, and analyzed carbon 49.42%, hydrogen 8.19%.

*Example 6.*—A mixture was prepared containing 0.5 mole of isobutylene, 1.5 moles of 1,3-dioxolane, and 0.14 mole of boron fluoride. The mixture was heated at 50° C. for 5 days and subsequently the catalyst was neutralized with 0.25 mole of sodium hydroxide. After removing the volatile constituents at steam bath temperature and a pressure of 1–2 mm. a viscous liquid product was obtained having a hydroxyl number of 32.9, combined $CH_2O$ of 22.2%, and iodine number of 15.5. The polymer contained 17 mole per cent of isobutylene by carbon and hydrogen analysis.

*Example 7.*—A mixture containing one mole of isoprene and one mole of 1,3-dioxolane together with 0.05 mole of $BF_3$ was held for three months at room temperature. After neutralizing the catalyst with ammonia to blue litmus, the product analyzed 54.83% carbon, 8.89% hydrogen, gave an iodine number of 403.4, and contained 17.2% of combined isoprene.

*Example 8.*—4.7 parts of dehydrohalogenated chloropolythene and 9 parts of 1,3-dioxolane was heated with a trace of boron trifluoride for 2 hours in a steam bath. The product was washed with aqueous ammonia to neutralize the catalyst. It was then washed with aqueous ammonia to neutralize the catalyst. It was then washed with methanol and finally with ether and subsequently dried at 100° C. at 1 mm. 5.5 parts of a tough polymer was obtained.

The polymers hereinbefore described may be used as plasticizers for rubber, artificial rubber, and resins generally; as sizes, softeners, mercerizing assistants, crush proofing assistants and assistants in textile uses; the high molecular weight polymers may find utility as films for use as grease proof liners for food containers, puncture proof fluid tanks and so forth; as polishes and waxes, and especially as substitutes for the mineral and vegetable waxes such as paraffin, ceresin, carnauba, japan, montan waxes and so forth; as print compositions, duplicator pad ingredients, paper sizes, paper adhesives, grease proofing agents, and protective coatings generally; as electrical insulators; as dispersing agents for rubber and latex; as ingredients in copolymers with rubber, artificial rubber, resins, and plastics, as protective coatings for rubber and, ingredients in self-sealing tires and tubes; as leather preservatives, softeners, plasticizers, and agents to make leather fat resistant; as dispersing agents and binders for cosmetic creams, lotions, lipstick and so forth; as sealing agents for oil and gas wells; as drilling mud ingredients to control thixotropy; as settling, viscosity, and flotation agents in ore treating; as binding agents for finely divided materials, such as ceramic pigments and so forth; as agents to prevent curling in cellulose films; as binders for abrasive wheels; as cutting aids in metal turning; and as plasticizers for glue, casein, proteins, gelatin, cork, cellulose and cellulose derivatives.

We claim:

1. A process for obtaining reaction products of 1,3-dioxolane containing the structural group —$CH_2OCH_2CH_2O$— which comprises polymerizing 1,3-dioxolane with an unsaturated hydrocarbon by mixing 1,3-dioxolane with the unsaturated hydrocarbon, the reaction being effected in the presence of an acid catalyst whereby a polymeric product is obtained containing the structural group —$CH_2OCH_2CH_2O$— combined with the unsaturated compound.

2. The product of claim 1.

3. A process for obtaining polymeric products from 1,3-dioxolane and styrene which comprises polymerizing 1,3-dioxolane with styrene by mixing 1,3-dioxolane and styrene and effecting the polymerization in the presence of an acid catalyst whereby a polymeric product containing the structural group —$CH_2OCH_2CH_2O$— combined with the styrene is obtained.

4. The product of claim 3.

5. A process of obtaining polymeric products from 1,3-dioxolane and butadiene which comprises polymerizing 1,3-dioxolane with butadiene by mixing 1,3-dioxolane and butadiene and effecting the polymerization in the presence of an acid catalyst whereby a polymeric product containing the structural group —$CH_2OCH_2CH_2O$— combined with the butadiene is obtained.

6. The product of claim 5.

7. A process of obtaining polymeric products from 1,3-dioxolane and isobutylene which comprises polymerizing 1,3-dioxolane with isobutylene by mixing 1,3 dioxolane and isobutylene and effecting the polymerization in the presence of an acid catalyst whereby a polymeric product containing the structural group

—CH₂OCH₂CH₂O— combined with the isobutylene is obtained.

8. The product of claim 7.

9. A process for obtaining reaction products of 1,3-dioxolane containing the structural group —CH₂OCH₂CH₂O— which comprises polymerizing 1,3-dioxolane with an unsaturated compound selected from the class consisting of unsaturated hydrocarbons, vinyl chloride, and chloroprene by mixing 1,3-dioxolane with the compound of the class, the polymerization being effected in the presence of an acid catalyst whereby a polymer is obtained containing the group

—CH₂OCH₂CH₂O— combined with the compound reacted.

DONALD JOHN LODER.
WILLIAM FRANKLIN GRESHAM.